C. LEARNED.
Cotton-Planter.
No. 23,981. Patented May 10, 1859.
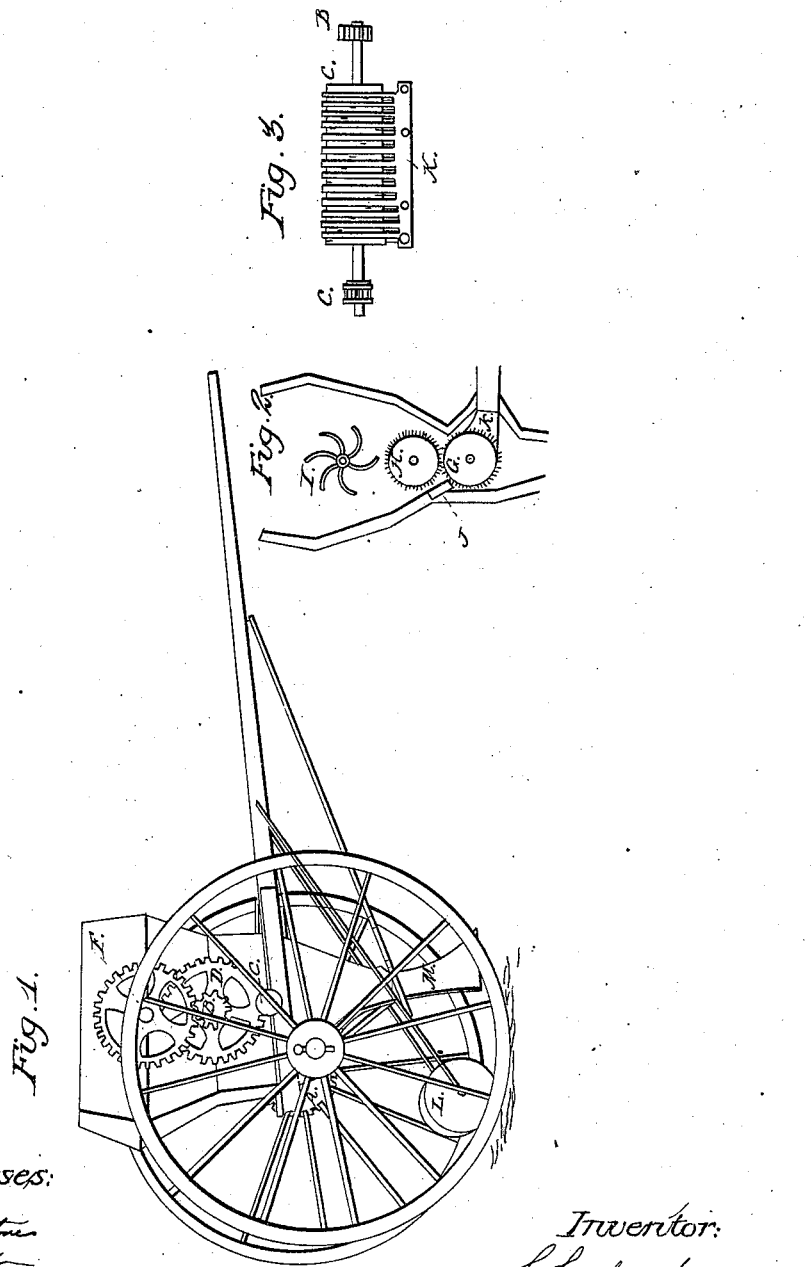

UNITED STATES PATENT OFFICE.

CHARLES LEARNED, OF INDIANAPOLIS, INDIANA, ASSIGNOR TO HIMSELF AND GEORGE P. STEVENS, OF SAME PLACE.

IMPROVEMENT IN SEED-DRILLS.

Specification forming part of Letters Patent No. 23,981, dated May 10, 1859.

*To all whom it may concern:*

Be it known that I, CHARLES LEARNED, of Indianapolis, in the county of Marion and State of Indiana, have invented a new and useful Improvement in Cotton-Drills, of which the following is an exact description, reference being had to the accompanying drawings and the letters marked thereon.

Figure 1 is a perspective; and Figs. 2 and 3 are sectional views, showing the construction and arrangement of the machine, in which A is a wheel attached to the axle of the same, and, gearing with the pinion B, gives motion to the toothed wheel G, over which the series of straps or guard K is arranged for the purpose of holding the cotton-seed from the surface of the same. The pinion C gives motion to the toothed roller H by means of the wheel D. The pinion E operates the wheel F, which is upon the same shaft with and gives motion to the agitator I.

The following is the operation of the machine. The seed being placed in the hopper O is brought in contact with the toothed roller H, by means of the agitator I, which is slowly revolved by the wheel F and pinion B. The roller H distributes the seed to the roller G, which, being guarded by the rack or series of straps K, picks the seed upon the teeth of the same and carries them singly under the elastic guard J, which yields to any hard substance larger than the seed, thus preventing the choking or clogging of the machine. As the seed is carried down through the tooth M and deposited in the furrow made by the same it is covered by the roller L. The advantages of this arrangement are seen by reference to the arrangement of the series of straps or guards K over the toothed roller G, by which the cotton-seed is prevented from matting or packing by traveling upon the roller as it revolves, while the teeth carry the same singly through under the elastic guard J, from which it falls into the tooth M, and is covered by the roller L.

What I claim, and desire to secure by Letters Patent, is—

The guard or series of straps K, in combination with the toothed roller G and elastic guard J, when operated in connection with the roller H and agitator I.

CHARLES LEARNED.

Witnesses:
   JOHN H. REDSTONE,
   GEO. P. STEVENS.